US012373685B2

(12) United States Patent
Sundararajan et al.

(10) Patent No.: US 12,373,685 B2
(45) Date of Patent: Jul. 29, 2025

(54) DYNAMICALLY ENHANCING SUPERVISED LEARNING

(71) Applicant: International Business Machines Corporation, Armonk, NY (US)

(72) Inventors: Mukundan Sundararajan, Bangalore (IN); Siddharth K. Saraya, Raniganj (IN)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 17/524,374

(22) Filed: Nov. 11, 2021

(65) Prior Publication Data

US 2023/0147585 A1 May 11, 2023

(51) Int. Cl.
*G06F 18/2415* (2023.01)
*G06F 18/211* (2023.01)
*G06F 18/40* (2023.01)
*G06N 3/08* (2023.01)

(52) U.S. Cl.
CPC ............. *G06N 3/08* (2013.01); *G06F 18/211* (2023.01); *G06F 18/2415* (2023.01); *G06F 18/40* (2023.01)

(58) Field of Classification Search
CPC .......... G06N 3/08; G06N 3/0895; G06N 3/09; G06N 3/091; G06N 3/092; G06N 3/094; G06N 3/096; G06N 3/098; G06N 3/0985; G06N 3/0499; G06F 18/211; G06F 18/2415; G06F 18/40
See application file for complete search history.

(56) References Cited

U.S. PATENT DOCUMENTS

| | | | |
|---|---|---|---|
| 9,082,083 B2 | 7/2015 | Virkar et al. | |
| 10,380,259 B2 * | 8/2019 | Lee | G06N 5/022 |
| 10,431,203 B2 * | 10/2019 | Millen | G06F 40/253 |
| 10,431,210 B1 * | 10/2019 | Huang | G06N 3/084 |
| 10,552,541 B1 * | 2/2020 | Dreher | G06N 5/02 |
| 10,931,692 B1 | 2/2021 | Mota et al. | |
| 2013/0287283 A1 * | 10/2013 | Kamath | G06F 18/40 |
| | | | 345/589 |
| 2015/0074021 A1 * | 3/2015 | Cao | G06F 16/48 |
| | | | 706/12 |
| 2015/0227519 A1 * | 8/2015 | Clark | G06F 16/334 |
| | | | 706/11 |
| 2015/0235132 A1 * | 8/2015 | Allen | G06F 16/951 |
| | | | 706/11 |
| 2018/0114164 A1 * | 4/2018 | Rana | G06F 16/903 |
| 2019/0042574 A1 * | 2/2019 | Kim | G06F 18/41 |
| 2019/0392035 A1 | 12/2019 | Indenbom | |
| 2020/0134422 A1 * | 4/2020 | Gliozzo | G06F 40/30 |
| 2021/0097345 A1 | 4/2021 | Goldstein et al. | |

* cited by examiner

*Primary Examiner* — K C Chen
*Assistant Examiner* — Kuang F Chen
(74) *Attorney, Agent, or Firm* — Randy Tejeda (57) ABSTRACT

Embodiments of the present invention provide an approach for dynamically enhancing supervised learning using factor modification based on parsing user input. A user selects an object being displayed incorrectly and provides input as to the reason. The user input is parsed to derive a factor that is contributing to the false outcome. The factor is dynamically altered resulting in a decision path that produces a positive outcome. The change is sent to a model or application owner for final validation and refined training of the machine learning model.

20 Claims, 5 Drawing Sheets

DYNAMICALLY ENHANCING SUPERVISED LEARNING

The present invention relates generally to machine learning, and more particularly, to dynamically enhancing supervised learning using factor modification based on parsing user input.

BACKGROUND

In computing systems, supervised learning is typically considered a subcategory of machine learning and artificial intelligence. It can be defined by its use of labeled datasets to train algorithms to classify data and/or to predict outcomes accurately. As input data is fed into the model, weights can be adjusted to tune the model until the model has been fitted appropriately, which occurs as part of the cross validation process.

Supervised learning can use a training set to teach models to yield the desired output. This training dataset can include inputs and correct outputs, which allow the model to learn over time. A machine learning algorithm measures its accuracy through the loss function, adjusting until the error has been sufficiently minimized.

SUMMARY

Embodiments of the present invention provide an approach for enhancing a machine learning process. Specifically, the present invention relates to a method and system for dynamically enhancing supervised learning using factor modification based on parsing user input.

One aspect of the present invention includes a computer-implemented method for dynamically enhancing supervised learning in a machine learning process, comprising the computer-implemented steps of: receiving a selection of a data object in an image produced as a result of a machine learning model, wherein the selection indicates that the data object contains a false outcome produced by the machine learning process; receiving user input related to a reason for the false outcome; parsing the user input to derive a noun and a verb; deriving, based on the noun, a factor of the model learning model contributing to the false outcome; and dynamically altering the factor based on the verb to yield a new decision path within the machine learning model that generates a new display of the data object having a positive outcome.

A second aspect of the present invention provides a system for dynamically enhancing supervised learning in a machine learning process, comprising: a memory medium comprising program instructions; a bus coupled to the memory medium; and a processor, for executing the program instructions, coupled to the memory medium that when executing the program instructions causes the system to: receive a selection of a data object in an image produced as a result of a machine learning model, wherein the selection indicates that the data object contains a false outcome produced by the machine learning process; receive user input related to a reason for the false outcome; parse the user input to derive a noun and a verb; derive, based on the noun, a factor of the model learning model contributing to the false outcome; and dynamically alter the factor based on the verb to yield a new decision path within the machine learning model that generates a new display of the data object having a positive outcome.

A third aspect of the present invention provides a computer program product for dynamically enhancing supervised learning in a machine learning process, the computer program product comprising a computer readable storage device, and program instructions stored on the computer readable storage device, to: receive a selection of a data object in an image produced as a result of a machine learning model, wherein the selection indicates that the data object contains a false outcome produced by the machine learning process; receive user input related to a reason for the false outcome; parse the user input to derive a noun and a verb; derive, based on the noun, a factor of the model learning model contributing to the false outcome; and dynamically alter the factor based on the verb to yield a new decision path within the machine learning model that generates a new display of the data object having a positive outcome.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the embodiments set forth herein. Rather, these illustrative embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Furthermore, the term "developer" refers to any person who writes computer software. The term can refer to a specialist in one area of computer programming or to a generalist who writes code for many kinds of software.

As indicated above, embodiments of the present invention provide an approach for dynamically enhancing supervised learning using factor modification based on parsing user input. A user selects an object being displayed incorrectly and provides input as to the reason. The user input is parsed to derive a factor that is contributing to the false outcome. The factor is dynamically altered resulting in a decision path that produces a positive outcome. The change is sent to a model or application owner for final validation and refined training of the machine learning model.

Supervised learning is an approach to creating artificial intelligence, where a computer algorithm is trained on input data that has been labeled for a particular output. The model is trained until it can detect the underlying patterns and relationships between the input data and the output labels, allowing it to yield accurate labeling results when presented with never-before-seen data. The aim of supervised learning is to make sense of data within the context of a specific question.

Today, supervised learning, like any typical machine learning (ML) algorithm, is based on training. During its training phase, a supervised learning system is fed with labeled data sets, which instruct the system what output is related to each specific input value. The trained model is then presented with test data. Test data is data that has been labeled, but the labels have not been revealed to the algorithm. The aim of the testing data is to measure how accurately the algorithm will perform on unlabeled data.

Embodiments of the present invention recognize several deficiencies related to enhancing supervised learning. In a virtual space, there can be text, audio, and images present in multiple forms. User input plays an important role in a supervised learning process. However, the information presented in these processes might not be simple and its representation and a user's perception can play a pivotal role in understanding the data. Multiple underlying factors relating to the data can be relied upon when determining how information is to be presented to a user.

Although these factors can play a role in presenting information to the user, they are generally not considered in the learning process today. A mechanism is needed to identify these factors and then, relying on user input for specifics, any identified individual factors can be used to enhance a supervised learning process by focusing on these factors rather than relying on a more generic approach. In other words, current supervised learning processes typically work in a manner that allows a user to provide comments generically on an entire frame of displayed information. An advantage to the enhanced supervised learning processed described herein allows the user to see the factors that contribute to what is being displayed. By providing the ability for the user to provide input related to these factors, the supervised learning process can be enhanced.

Figure 1:
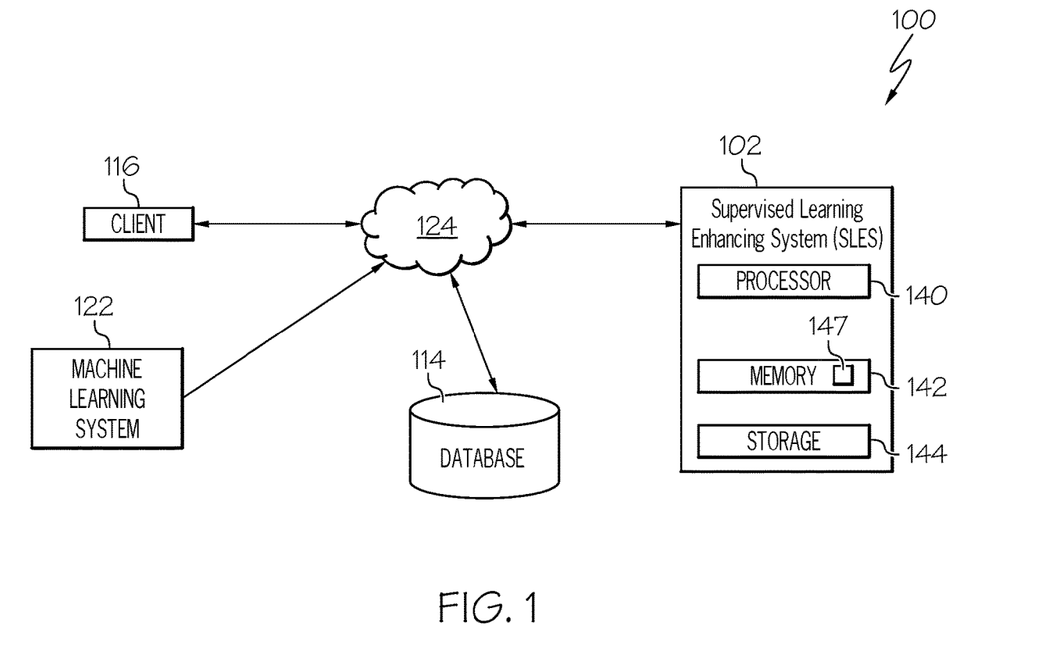
FIG. 1 is a block diagram of an environment according to an embodiment of the present invention.

FIG. 1 is a block diagram of an environment 100 for embodiments of the present invention. At 102, there is a supervised learning enhancing system (SLES). SLES 102 is an electronic computation device. SLES 102 includes a processor 140, memory 142, and storage 144. Memory 142 comprises instructions 147, which when executed by the processor, cause system to implement embodiments of the invention. SLES 102 is in communication with network 124. Network 124 may be the internet, a wide area network, a local area network, a cloud network, or other suitable network.

Also connected to network 124 is a machine learning (ML) system 122. Machine learning is a field of computer science that aims to teach computers how to learn and act without being explicitly programmed. More specifically, machine learning is an approach to data analysis that involves building and adapting models, which allow programs to "learn" through experience. Machine learning involves the construction of algorithms that adapt their models to improve their ability to make predictions. While SLES 102 and ML system 122 are shown as separate systems, in some embodiments these both may be integrated into a single system.

In machine learning and artificial intelligence, supervised learning refers to a class of systems and algorithms that determine a predictive model using data points with known outcomes. The model is learned by training through an appropriate learning algorithm (such as linear regression, neural networks, etc.) that typically works through some optimization routine to minimize a loss or error function.

Put another way, supervised learning is the process of teaching a model by feeding it input data as well as correct output data. This input/output pair is usually referred to as "labeled data". Supervised learning is often used to create machine learning models for two types of problems: regression and classification. With regression, the model finds outputs that are real variables (number which can have decimals). With classification, the model finds classes in which to place its inputs.

Client device 116 is shown connected to network 124. These computing devices are used by users to communicate with the SLES 102 and other items on the network. Client device 116 may be laptop computers, desktop computers, smartphones, tablets, or other suitable devices. In practice, there may be more client devices than the one shown in FIG. 1.

Database 114 is connected to network 124. Database 114 stores information used by client device 116, machine learning system 122, and/or SLES 102. This information can include training data, one or more machine learning models and algorithms, underlying factors or features which contribute to what is being displayed to client 116, etc. Example factors can include, but are not limited to, shading, zoom level, etc. for a displayed image. Factors can further include underlying formulas or values needed to display information (e.g., financial data) to client 116.

Figure 2:
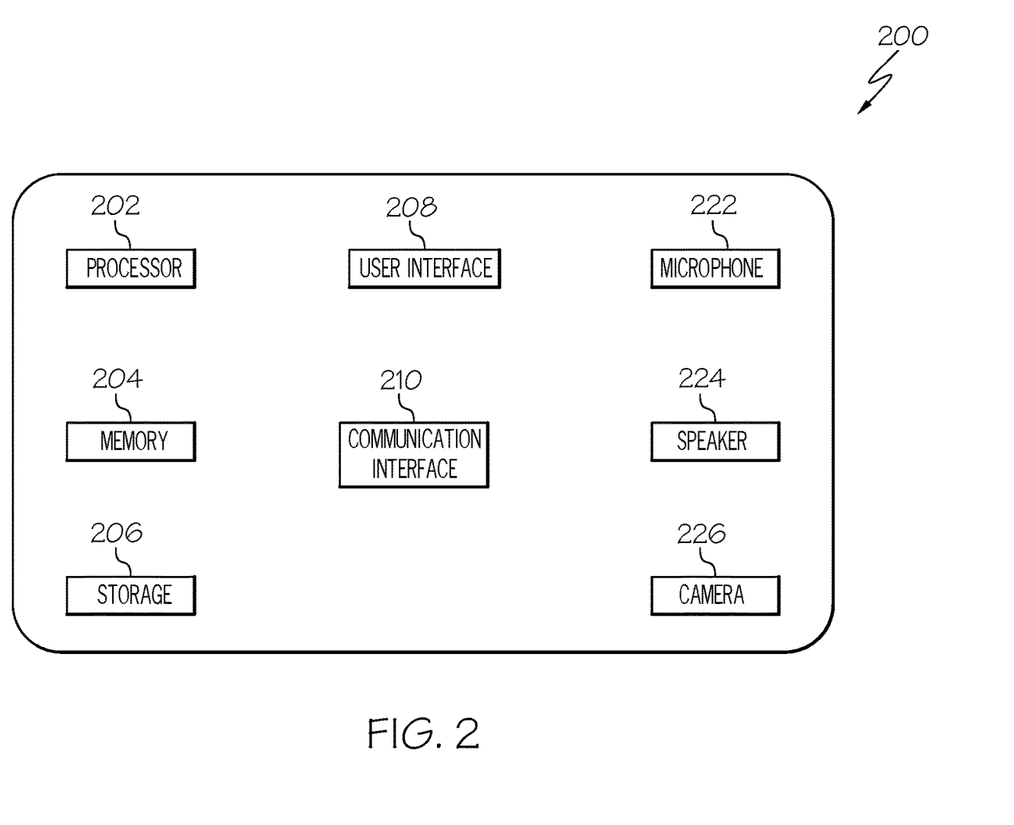
FIG. 2 is a block diagram of a client device according to an embodiment of the present invention.

FIG. 2 is a block diagram of an electronic device 200 used in accordance with embodiments of the present invention that may act as a client device such as client 116 device of FIG. 1. Device 200 can be a smartphone, tablet computer, or other computing device. Device 200 includes a processor 202, which is coupled to a memory 204. Memory 204 may include dynamic random-access memory (DRAM), static random-access memory (SRAM), magnetic storage, and/or a read only memory such as flash, EEPROM, optical storage, or other suitable memory. In some embodiments, the memory 204 may not be a transitory signal per se.

Device 200 may further include storage 206. In embodiments, storage 206 may include one or more magnetic storage devices such as hard disk drives (HDDs). Storage 206 may additionally include one or more solid state drives (SSDs). Device 200 further includes user interface 208. This may be a display, such as an LED display, a touch-sensitive screen, a keyboard, a mouse, or any other suitable interface for a user to interact with device 200.

The device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network.

Device 200 may further include a microphone 222 used for receiving speech utterances, and/or other sounds. Device 200 may further include a speaker 224 used for outputting audio data, such as speech, music, and/or other sounds. Device 200 may further include a camera 226 for acquiring still and/or video images.

Figure 3:
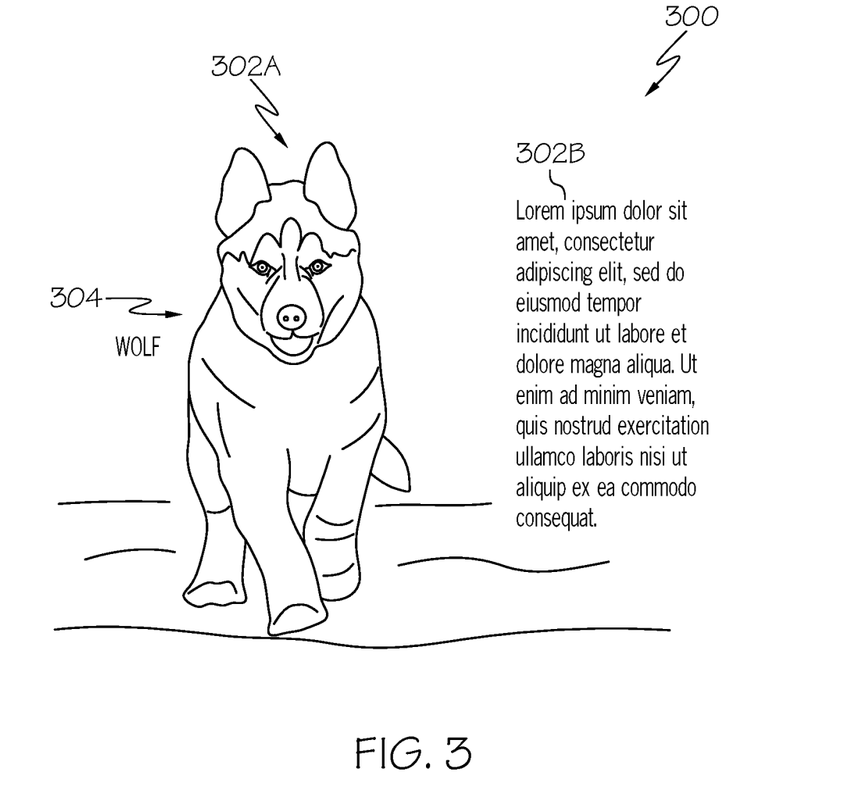
FIG. 3 shows an example digital content according to an embodiment of the present invention.

FIG. 3 shows an example of digital content 300 in accordance with embodiments of the present invention. Displayed digital content can include text, images, video data, audio data, and/or other forms of content. As shown, digital content 300 includes image 302A (i.e., Husky dog) and text 302B. The digital content is displayed on user interface 208. Label 304 is generated by machine learning system 122 from an existing machine learning model. As stated, supervised learning is a learning in which machine learning system 122 is taught (or trained) using data which is already tagged (or labeled) with the correct answer. After that, machine learning system 122 is provided with the new set of inputs (i.e., data) without the target label (or desired output) and the machine predicts the output of the new data by applying its learning from historical trained data. However, in some cases, the desired output may be incorrect given the supplied input.

As shown in FIG. 3, machine learning system 122 has received image 302A as an input and predicted or classified the image incorrectly as a wolf. A user can select (or flag) any part of digital content 300 the user recognizes as being displayed incorrectly. The can be a developer who is involved in the training, an end user, and/or the like. In this case, the user recognizes image 302A is being misidentified and selects it. In an embodiment, a selection area specification tool may be provided that enables the user to draw or otherwise specify a selection area perimeter. By way of illustration, the user may select the tool, specify a first corner via a pointer (e.g., mouse, stylus, finger), drag the pointer to indicate a diagonally opposite corner, and a corresponding perimeter will be drawn (e.g., using dashed lines or other indicator), which may be in the form of a rectangle or square (although other shapes may be used). In other embodiments, the user may use a different means for selecting digital content (in whole or in part) that they believe is being displayed incorrectly.

The SLES 102 receives the selection (i.e., image 302A) made by the user. SLES 102 then prompts the user to provide additional information as to how they think the selected information is being presented incorrectly. The user can provide input (e.g., by speaking into microphone 222, entering text via user interface 208, etc.) to SLES 102. SLES 102 parses the input (e.g., voice, text, etc.) to determine what the user is attempting to communicate.

Machine learning algorithms generally do not need to be programmed with specific rules that define what to expect from the input. The machine learning algorithm instead learns from processing many labeled examples that are supplied during training and using this answer key to learn what factors (i.e., features, characteristics, etc.) of the input are needed to construct the correct output. Once a sufficient number of examples have been processed, a neural network composed of artificial nodes can begin to process new, unseen inputs and successfully return accurate results. The more examples and variety of inputs the program sees, the more accurate the results typically become because the program learns with experience.

Figure 4:
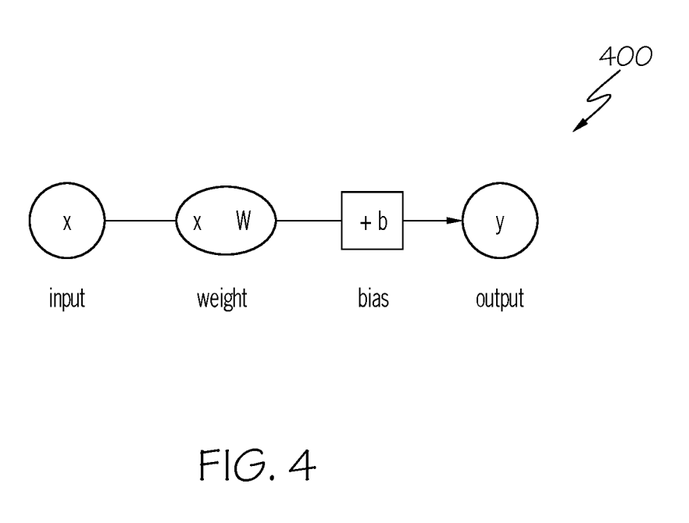
FIG. 4 shows a machine learning node according to an embodiment of the present invention.

FIG. 4 shows an example node 400 in accordance with embodiments of the present invention. Individual node 400 can be thought of as its own linear regression model, composed of input data, weights, a bias (or threshold), and an output. Linear regression analysis is used to predict the value of a variable based on the value of another variable. Once an input layer is determined, weights are assigned. These weights help determine the importance of any given variable, with larger ones contributing more significantly to the output compared to other inputs. All inputs are then multiplied by their respective weights and then summed.

Afterward, the output is passed through an activation function, which determines the output. If that output exceeds a given threshold, it activates the node, passing data to the next layer in the network. This results in the output of one node becoming in the input of the next node. This process of passing data from one layer to the next layer defines this neural network as a feedforward network. The output layer in an artificial neural network is the last layer of nodes or neurons that produces given outputs for the program.

Today, in supervised learning, once a ML model is trained and hyper parameters (i.e., parameters whose values are used to control the learning process) are tuned, any false outcomes in identifying objects cannot be dynamically corrected to improve the accuracy of the model. The SLES 102 identifies and creates any number of input groups contributing to the different factors (or features) of the object that could affect the object classification into a false outcome. Based on the user input, the SLES 102 determines which factor (or sub-factor) is contributing to the false outcome and provides validation by modifying the factor or its value (input group/its value) at the output layer to determine whether the ML model outcome has changed to a true outcome (true positive or true negative), thereby dynamically improving the supervised learning accuracy.

To accomplish this, the SLES 102 includes a parser model that decomposes the user's input. The input can be in written or spoken text and is translated to a set of instructions that (a) point to an object or part of the object (i.e., establish a reference to the context), (b) the factors/aspects of the objects in question and the type of change being proposed to either the physical contour or to a behavior, (c) determine the decision path in the ML model that are related to (a) and (b) here and the type of change to the ML model based on (b) above and maps these to the input factors (features/subfactors) groups to identify the pathways that need to be changed.

Referring back to FIG. 3, image 302A is being displayed. The title of the image indicates it has been classified as a wolf. On looking at the image, a user understands that the image is wrongly tagged as a wolf. It is actually a Husky dog. Factors in the displayed image include the shading, zoom level, etc. The user enters that the grey tone is high for shading. Based on user input, the SLES 102 changes the parameter mentioned by the user. On changing the shading done, the SLES 102 validates that the animal in the image is a dog. User inputs and system validation results are shared with one or more application owners for validation. Based on an application owner concurrence, the SLES 102 updates the ML model based on the image. The process is discussed in greater detail below.

In an embodiment, the user input is parsed into nouns and verbs. The nouns are associated to factors relating to the objects being presented. Verbs in the user input are identified and related to proposed action on a particular noun. Said another way, the nouns give a focused approach on which objects to action on, while the verbs give an indication as to change(s) to be made to the factors that are contributing to the false outcome or output so that validation can be done for the correct outcome the user is trying to communicate. Preliminary verification is done by the SLES 102 after altering these factors. The user input and analysis is presented to a model or application owner for final validation and dynamic alteration of the ML model.

Dynamic alteration of the ML model is done by making finer adjustments to the neural network nodes and/or number of weights in the intermediate layers and providing the result for the model owner review. The adjustments proposed and implemented in the ML model can include (a) increasing either the density of nodes in multiple layers by looking at the compute pathway based on the significance of the computed values in determination of the object/object part or (b) modifying the weights/constant values of specific nodes to increase the discriminatory power of nodes in the path or (c) conditional switches being enabled in nodes/layers to change the weights/constants.

In an embodiment, the input values for the different factors can be vector X. The data is transformed into an information object by applying functions that could be a mathematical function (formula) or a numerical resolved transformation such as with artificial intelligence (AI) in image recognition. When a model result is pointed out as incorrect and the justification is provided regarding the mathematical formula or AI solution, the weights contributing to the region where the correction has to be applied are taken up. This is different from ML models where only a part of the weights are updated. In this case, a false positive is pointed out by a user and the difference between the false positive and true positive is expressed by the user. Essentially the steps in the transformation need to be known for any corrections, which is a benefit gained from this solution.

The other elaboration needed is the mapping translation from the user's linguistic expression to the precise points in the calculation where the transformation has to be adjusted. Again, this is accomplished by using an enhanced parser model. Typical parsers construct the sentence grammar by assigning the parts of speech to the words in a sequence to keep the grammar validity. However for this, the user shares sentences in their observations, which consist of nouns and verbs but the grammar may not be entirely valid in that there would be conditions where multiple nouns are mentioned in sequence and then the verb joining the last subject and predicate, but the relationship may need to be extended.

The proposed parser works with a prior knowledge that the nouns have a relation to the factors of the data and verbs correspond to actions that need to cover all the mentioned factors. Based on the industry and problem space, the grammar rules can be different and the parser can be provided the likely set of grammar rules so that it can de-construct the user input to help determine the influencing decision paths in the ML model. If there are multiple models possible, the SLES 102 checks out the all the models and recommends the weights/filters that need to be changed.

Applying it to the dog misclassification example shown in FIG. 3, the user provided the inputs that the "gray coloring in the face or shading in the face (of the object in the image) is the point of confusion and hence needs more filtering". The parser de-constructs it as "gray(ADV) coloring(NN/ VN) in (PR)the( )face(NN) or(CON) shading(VN) in the face(NN) (of the object in the image) is(VN) the( ) point (ADV) of( )confusion(NN) and(CON) hence(MD) needs (VN) more(ADV) filtering(NN/ADV)" as provided by current parsers (e.g., Stanford NLP engine). The proposed parser will read "gray coloring, face, confusion, more filters" as nouns and "needed" as the verb, providing the input to the ML that both gray coloring and face need more filters. The ML determines the current filters or paths for both face identification and the color tone for the face and adds more neurons and/or weights in the intermediate layers for these paths, trains with the training data sets, and runs the image to test if the decision cluster assigned is correct.

In another example, assume financial information related to a company is being displayed on device 200. For this example, a user is shown various parameters like price book ratio, earnings per share, price equity ratio, and the like. All these parameters being displayed are nouns. The user says that the financial data being displayed is incorrect. On request for more information, the user says that though the earnings per share has increased, the price equity ratio is not reflecting an increase. The SLES 102 analyzes the nouns being discussed. In this case, the nouns are "earnings per share" and "price equity". The verbs are also identified. In this case, the verb "increased" is being input by the user.

The underlying factors or data parameters that influence these nouns are brought to the attention of the user. In this case, the profit dividend, outstanding share count for earning per share, price of the equity, and earning per share for price equity share are presented to the user because these values directly affect the numbers (nouns) mentioned by the user. The user sees the data and either agrees it to be correct by validating it themself or they would point out the error in the values or underlying formula. For example, the user enters text in the form that outstanding share count is not correct and provides the correct value. The user input is captured the financials recalculated based on the provided input to verify if the user input maps to their concern. These user inputs and recalculation is then stored and an alert is raised to the application owners for validation. Based on application owner acceptance, the factor is readjusted and displayed.

Figure 5:
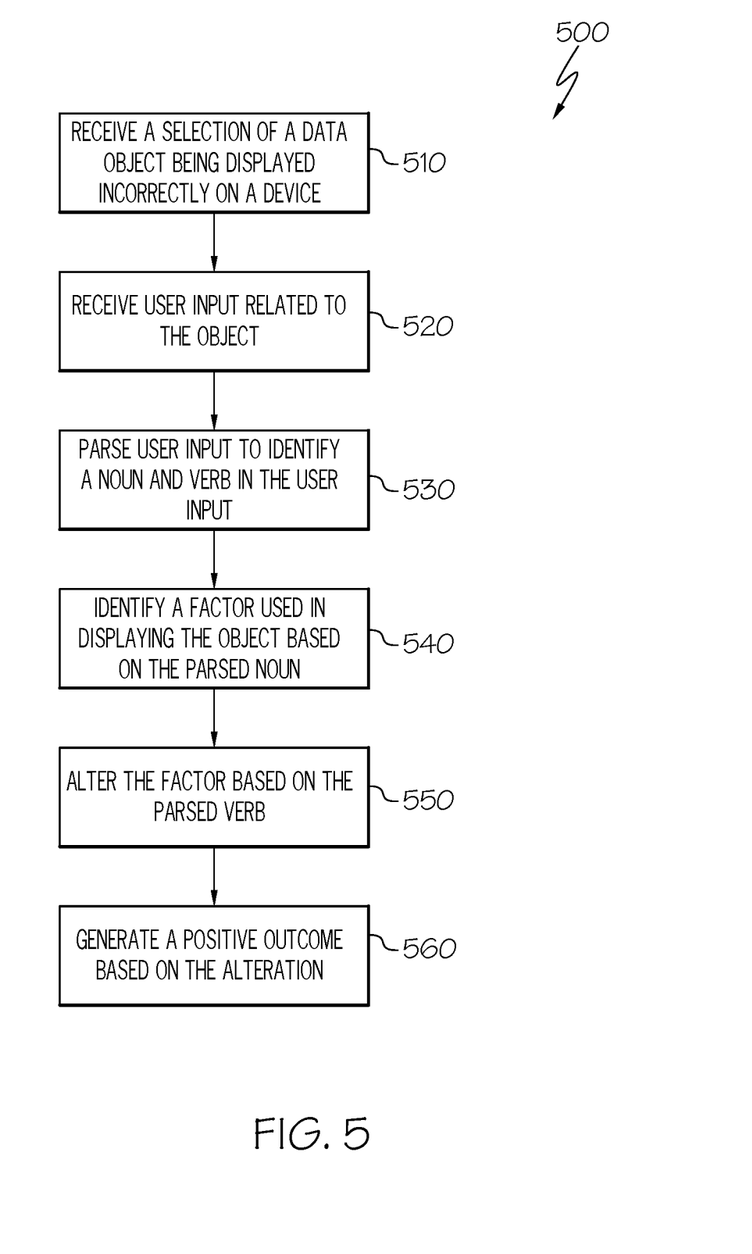
FIG. 5 shows a method flow diagram for enhancing machine learning according to an embodiment of the present invention.

FIG. 5 shows a method flow diagram 500 for enhancing machine learning according to an embodiment of the present invention. Information is displayed as digital content on device 200. A user notices that an object (e.g., image, amount, etc.) is incorrect and selects the object (or part of) that is in error. At 510, SLES 102 receives the selected object. SLES 102 prompts the user for input as to why the user thinks the object is incorrect. At 520, SLES 102 receives the user input. At 530, SLES 102 parses the user input to identify nouns and verbs. Each noun is mapped to an object in the frame. Verbs are also identified to determine what action the user believes is needed upon a particular object (or noun). At 540, based on a parsed noun, SLESS 102 identifies an underlying factor which is contributing to the false outcome (e.g., identification, classification, derived value, etc.) associated with the object in question.

The parsed verb gives an indication as to how the identified underlying factor should be changed so that validation can be done for what user is trying to communicate. Said another way, altering the factor (or weight of the factor) can influence the decision path that is chosen by the ML process in order to produce a positive outcome (e.g., classification, etc.). At 550, SLES 102 dynamically alters or modifies the factor based on the parsed verb. At 560, SLES 102 validates the altered factor relating to the object by generating a new ML output and determining whether the output is now correct. The change is sent to a model or application owner for final validation and refined training of the ML model.

It will be appreciated that the method process flow diagrams of FIG. 5 represents possible implementations of process flows for dynamically enhancing supervised learning using factor modification based on parsing user input, and that other process flows are possible within the scope of the invention. The method process flow diagrams discussed above illustrate the architecture, functionality, and operation of possible implementations of systems, methods and computer program products according to various embodiments of the present invention. In this regard, each portion of each flowchart may represent a module, segment, or portion of code, which comprises one or more executable instructions for implementing the specified logical function(s). It will also be noted that each block of each flowchart illustration can be implemented by special purpose hardware-based systems that perform the specified functions or acts.

Further, it can be appreciated that the approaches disclosed herein can be used within a computer system for dynamically enhancing supervised learning using factor modification based on parsing user input. In this case, as shown in FIG. 1, SLES 102 can be provided, and one or more systems for performing the processes described in the invention can be obtained and deployed to computer infrastructure 102 (FIG. 1). To this extent, the deployment can comprise one or more of: (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 12 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 12 may be practiced in distributed computing environments where tasks are performed by remote processing devices that are linked through a communication network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, IoT governing engine 50 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided with this invention an approach for dynamically enhancing supervised learning using factor modification based on parsing user input. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method, comprising the computer-implemented steps of:
   receiving a selection of a data object in an image produced as a result of a machine learning model, wherein the selection indicates that the data object contains a false outcome produced by a supervised machine learning process;
   receiving user input related to a reason for the false outcome;
   parsing the user input to derive a noun and a verb;
   deriving, based on the noun, a factor of the machine learning model contributing to the false outcome; and
   dynamically altering, based on the verb, the factor to yield a new decision path within the machine learning model that generates an alteration of the data object in the image having a positive outcome, wherein the new decision path is created by increasing a density of nodes, within the machine learning model, based on computed values determined from the verb during the supervised machine learning process.

2. The computer-implemented method of claim 1, wherein the false outcome is associated with a misclassification of the data object and the positive outcome is associated with a correct classification of the data object.

3. The computer-implemented method of claim 1, wherein the user inputs a selection from the group consisting of: a voice input or a text input.

4. The computer-implemented method of claim 1, wherein dynamically altering the factor includes adding more weight to the factor to influence a selection of the new decision path in the machine learning process.

5. The computer-implemented method of claim 1, further comprising presenting the positive outcome for approval.

6. The computer-implemented method of claim 5, further comprising performing a final update, upon approval, of the machine learning model based on the dynamic alteration of the factor.

7. The computer-implemented method of claim 1, wherein dynamically altering the factor includes adding the new decision path to the machine learning model.

8. A system, comprising:
   a memory medium comprising program instructions;
   a bus coupled to the memory medium; and a processor, for executing the program instructions, coupled to the memory medium that when executing the program instructions causes the system to:

receive a selection of a data object in an image produced as a result of a machine learning model, wherein the selection indicates that the data object contains a false outcome produced by a supervised machine learning process;

receive user input related to a reason for the false outcome;

parse the user input to derive a noun and a verb;

derive, based on the noun, a factor of the machine learning model contributing to the false outcome; and dynamically alter, based on the verb, the factor to yield a new decision path within the machine learning model that generates an alteration of the data object in the image having a positive outcome, wherein the new decision path is created by increasing a density of nodes, within the machine learning model, based on computed values determined from the verb during the supervised machine learning process.

9. The system of claim 8, wherein the false outcome is associated with a misclassification of the data object and the positive outcome is associated with a correct classification of the data object.

10. The system of claim 8, wherein the user inputs a selection from the group consisting of: a voice input or a text input.

11. The system of claim 8, wherein dynamically altering the factor includes adding more weight to the factor to influence a selection of the decision path in the machine learning process.

12. The system of claim 8, the memory medium further comprising instructions to present the positive outcome for approval.

13. The system of claim 12, the memory medium further comprising instructions to perform a final update, upon approval, of the machine learning model based on the dynamic alteration of the factor.

14. The system of claim 8, wherein dynamically altering the factor includes adding the new decision path to the machine learning model.

15. A computer program product comprising a computer readable storage device, and program instructions stored on the computer readable storage device, to:

receive a selection of a data object in an image produced as a result of a machine learning model, wherein the selection indicates that the data object contains a false outcome produced by a supervised machine learning process;

receive user input related to a reason for the false outcome;

parse the user input to derive a noun and a verb;

derive, based on the noun, a factor of the machine learning model contributing to the false outcome; and dynamically alter, based on the verb, the factor to yield a new decision path within the machine learning model that generates an alteration of the data object in the image having a positive outcome, wherein the new decision path is created by increasing a density of nodes, within the machine learning model, based on computed values determined from the verb during the supervised machine learning process.

16. The computer program product of claim 15, wherein the false outcome is associated with a misclassification of the data object and the positive outcome is associated with a correct classification of the data object.

17. The computer program product of claim 15, wherein the user inputs a selection from the group consisting of: a voice input or a text input.

18. The computer program product of claim 15, wherein dynamically altering the factor includes adding more weight to the factor to influence a selection of the new decision path to the machine learning process.

19. The computer program product of claim 15, further comprising program instructions stored on the computer readable storage device to present the positive outcome for approval.

20. The computer program product of claim 19, further comprising program instructions stored on the computer readable storage device to perform a final update, upon approval, of the machine learning model.

* * * * *